United States Patent
Heyne et al.

(10) Patent No.: US 11,220,188 B2
(45) Date of Patent: Jan. 11, 2022

(54) MOTOR VEHICLE CHARGING CABLE

(71) Applicant: Dr. Ing. h.c. F. Porsche Aktiengesellschaft, Stuttgart (DE)

(72) Inventors: Raoul Heyne, Wiernsheim (DE); Jari Roenfanz, Muehlacker (DE); David Koehler, Bietigheim-Bissingen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 95 days.

(21) Appl. No.: 16/876,231

(22) Filed: May 18, 2020

(65) Prior Publication Data
US 2020/0361327 A1    Nov. 19, 2020

(30) Foreign Application Priority Data
May 16, 2019 (DE) ...................... 10 2019 112 843.9

(51) Int. Cl.
| | |
|---|---|
| *B60L 53/18* | (2019.01) |
| *B60L 53/302* | (2019.01) |
| *B60L 53/16* | (2019.01) |
| *H01B 3/30* | (2006.01) |
| *H01B 7/18* | (2006.01) |
| *H01B 7/42* | (2006.01) |
| *H02J 7/00* | (2006.01) |
| *B60K 6/28* | (2007.10) |

(52) U.S. Cl.
CPC .............. *B60L 53/18* (2019.02); *B60L 53/16* (2019.02); *B60L 53/302* (2019.02); *H01B 3/305* (2013.01);
(Continued)

(58) Field of Classification Search
CPC ........ B60L 53/18; B60L 53/302; B60L 53/16; H01B 3/305; H01B 7/18; H01B 7/425;
(Continued)

(56) References Cited

U.S. PATENT DOCUMENTS

| 9,061,597 B2 | 6/2015 | Oda et al. |
| 10,029,575 B2 | 7/2018 | Remisch |

(Continued)

FOREIGN PATENT DOCUMENTS

| DE | 10 2015 120 048 | 5/2017 |
| DE | 10 2017 124 028 | 4/2019 |

(Continued)

OTHER PUBLICATIONS

German Search Report dated Mar. 25, 2020.

*Primary Examiner* — Suresh Memula
(74) *Attorney, Agent, or Firm* — Gerald E. Hespos; Michael J. Porco; Matthew T. Hespos (57) ABSTRACT

A motor vehicle charging cable for DC voltage charging of an electrical energy store of a motor vehicle has a cable sheath that encloses conductors, such as first and second cooling-fluid-cooled electrical conductor for first and second DC voltage phases, a ground conductor or equipotential bonding conductor and/or at least one control conductor. Shaped elements are arranged between the cable sheath and the conductors at positions of the motor vehicle charging cable that are fixed in mounts. The shaped elements guide, clamp and restrict a relative movement between the conductors. The cable sheath restricts a relative movement between the conductors between those positions at which the motor vehicle charging cable is fixed in mounts.

12 Claims, 5 Drawing Sheets

(52) U.S. Cl.
CPC .............. *H01B 7/18* (2013.01); *H01B 7/425* (2013.01); *H02J 7/0045* (2013.01); *B60K 6/28* (2013.01); *B60Y 2200/91* (2013.01); *B60Y 2200/92* (2013.01); *B60Y 2300/91* (2013.01)

(58) Field of Classification Search
CPC ..... H02J 7/0045; B60K 6/28; B60Y 2200/91; B60Y 2200/92; B60Y 2300/91
USPC ........................................................ 320/109
See application file for complete search history.

(56) References Cited

U.S. PATENT DOCUMENTS

| | | | |
|---|---|---|---|
| 2011/0169447 A1* | 7/2011 | Brown | .................... B60L 53/16 320/109 |
| 2012/0206100 A1* | 8/2012 | Brown | .................. B60L 3/0069 320/109 |
| 2017/0144558 A1* | 5/2017 | Remisch | .................. H01B 9/02 |
| 2019/0217728 A1* | 7/2019 | Reber | ..................... B60L 53/11 |
| 2019/0237218 A1* | 8/2019 | Heyne | ..................... B60L 53/16 |
| 2019/0392962 A1* | 12/2019 | Inoue | ..................... H01B 7/292 |
| 2020/0307400 A1* | 10/2020 | de Chazal | ............ H01R 13/005 |
| 2021/0296023 A1* | 9/2021 | Nakao | ..................... H01B 7/02 |

FOREIGN PATENT DOCUMENTS

| | | | |
|---|---|---|---|
| DE | 10 2018 125 835 | 4/2019 | |
| WO | WO-2014209261 A * | 12/2014 | ............... H02G 11/02 |
| WO | WO-2016083544 A1 * | 6/2016 | ............... B60L 53/18 |
| WO | WO-2017043780 A1 * | 3/2017 | ............... H01B 7/24 |
| WO | 2017/133893 | 8/2017 | |
| WO | WO-2017207266 A1 * | 12/2017 | ............... B60L 53/18 |
| WO | WO-2021091216 A1 * | 5/2021 | ............ B60L 53/302 |

\* cited by examiner

MOTOR VEHICLE CHARGING CABLE

CROSS REFERENCE TO RELATED APPLICATION

This application claims priority under 35 USC 119 to German Patent Appl. No. 10 2019 112 843.9 filed on May 16, 2019, the entire disclosure of which is incorporated herein by reference.

BACKGROUND

Field of the Invention. The invention relates to a motor vehicle charging cable.

Related Art. DE 10 2015 120 048 A1 discloses a motor vehicle charging cable for DC voltage charging of an electrical energy store of a motor vehicle. In this regard, the prior art discloses a motor vehicle charging cable comprising a first electrical conductor for a first DC voltage phase, a second electrical conductor for a second DC voltage phase, and a cable sheath surrounding the first and second electrical conductors of the charging cable. Each of the electrical conductors has a conductor sleeve embodied as an insulation layer, and conductor cores of the respective electrical conductor run in the insulation layer of the respective electrical conductor. A cooling fluid channel is formed between the insulation layer and the conductor cores of the respective electrical conductor, and a cooling fluid for cooling the respective electrical conductor can be guided in the cooling fluid channel. Thus, cooling liquid flows around the conductor cores of the respective electrical conductor and the conductor cores accordingly are cooled by cooling fluid from the outside.

Electric charging powers are becoming increasingly greater. Thus, more waste heat arises during charging, and the waste heat must be dissipated from the electrical conductors of the motor vehicle charging cable. As a result, motor vehicle charging cables are having larger diameters and can be handled only with difficulty due to their high stiffness and large bending radii. There is therefore a need for a motor vehicle charging cable that enables efficient heat dissipation and easy handling.

It is an object of the invention to provide a cooling-fluid-cooled motor vehicle charging cable that can be handled more easily.

SUMMARY

The motor vehicle charging cable according to the invention has a cable sheath, a first cooling-fluid-cooled electrical conductor for a first DC voltage phase and a second cooling-fluid-cooled electrical conductor for a second DC voltage phase, a ground conductor or equipotential bonding conductor and at least one control conductor. The first and second electrical conductors, the ground conductor or equipotential bonding conductor and the at least one control conductor are enclosed by the cable sheath.

The motor vehicle charging cable has a first and second ends. The first end has a charging plug that can be coupled to a charging socket of a motor vehicle and the second end is able to be coupled to a charging station.

Regions of the motor vehicle charging cable at least at the first and second ends have shaped elements arranged between the cable sheath and the electrical conductors, the ground conductor or equipotential bonding conductor and/or the at least one control conductor. The shaped elements guide, clamp and restrict a relative movement between the electrical conductors, the ground conductor or equipotential bonding conductor and/or the at least one control conductor.

The cable sheath restricts relative movements between the electrical conductors, the ground conductor or equipotential bonding conductor and/or the at least one control conductor between those positions at which the motor vehicle charging cable is fixed in mounts.

The electrical conductors running in the cable sheath, the ground conductor or equipotential bonding conductor and/or the at least one control conductor are guided and clamped by shaped elements exclusively at such positions of the motor vehicle charging cable at which the motor vehicle charging cable is fixed in mounts. It is only in these positions that the relative movement between the electrical conductors, the ground conductor or equipotential bonding conductor and/or the at least one control conductor is restricted by the shaped elements in addition to the cable sheath. At intervening positions, at which the motor vehicle charging cable is not fixed in mounts, the cable sheath restricts the relative movement between the conductors guided in the cable sheath.

Filling material positioned in the cable sheath between the electrical conductors, the ground conductor or equipotential bonding conductor and/or the at least one control conductor in the case of known motor vehicle charging cables is thus dispensed with in the case of the motor vehicle charging cable according to the invention. Better flexibility and easy handling of the motor vehicle charging cable therefore are ensured, while heat nevertheless can be dissipated effectively from the motor vehicle charging cable by virtue of the cooling of the electrical conductors.

The shaped element of one embodiment has a cylindrical main body with a lateral surface having slots or grooves that run in the longitudinal direction and via which the electrical conductors, the ground conductor or equipotential bonding conductor and/or the at least one control conductor are insertable into cutouts of the respective shaped element. The shaped element advantageously receives the electrical conductors, the ground conductor or equipotential bonding conductor and/or the at least one control conductor. The shaped element also guides and clamps the conductors reliably at the corresponding positions at which the respective shaped element is positioned along the motor vehicle charging cable.

Clamping elements are arranged around the cable sheath at those positions of the motor vehicle charging cable at which the shaped elements are arranged. The clamping elements press the cable sheath against the shaped elements. A shaped element may be arranged between the cable sheath and the electrical conductors, the ground conductor or equipotential bonding conductor and/or the at least one control conductor at each position of the motor vehicle charging cable that is fixed in a mount. Additionally, bipartite clamping elements, such as clamping rings may be arranged around the cable sheath. The clamping elements at those positions of the motor vehicle charging cable at which the shaped elements are positioned press the cable sheath against the shaped elements for securely clamping the conductors running in the cable sheath.

The motor vehicle charging cable may be fixed at one or more positions between the first and second ends of the motor vehicle charging cable in a mount, in particular in a rooflike cantilever of the charging station adjacent to the second end and/or in a handle adjacent to the first end. If the motor vehicle charging cable, between the first end and the second end thereof, is also fixed in a corresponding mount at a rooflike cantilever of the charging station, a corresponding shaped element is also positioned at this position. The same holds true if an additional handle is provided on the motor vehicle charging cable to grip and maneuver the motor vehicle charging cable with a first hand in the region of the charging plug and with a second hand on the handle.

Preferred developments of the invention are evident from the dependent claims and the following description. Exemplary embodiments of the invention will be explained in greater detail with reference to the drawing, without being restricted thereto.

DETAILED DESCRIPTION

The invention relates to a motor vehicle charging cable for DC voltage charging of an electrical energy store of a motor vehicle.

Figure 1:
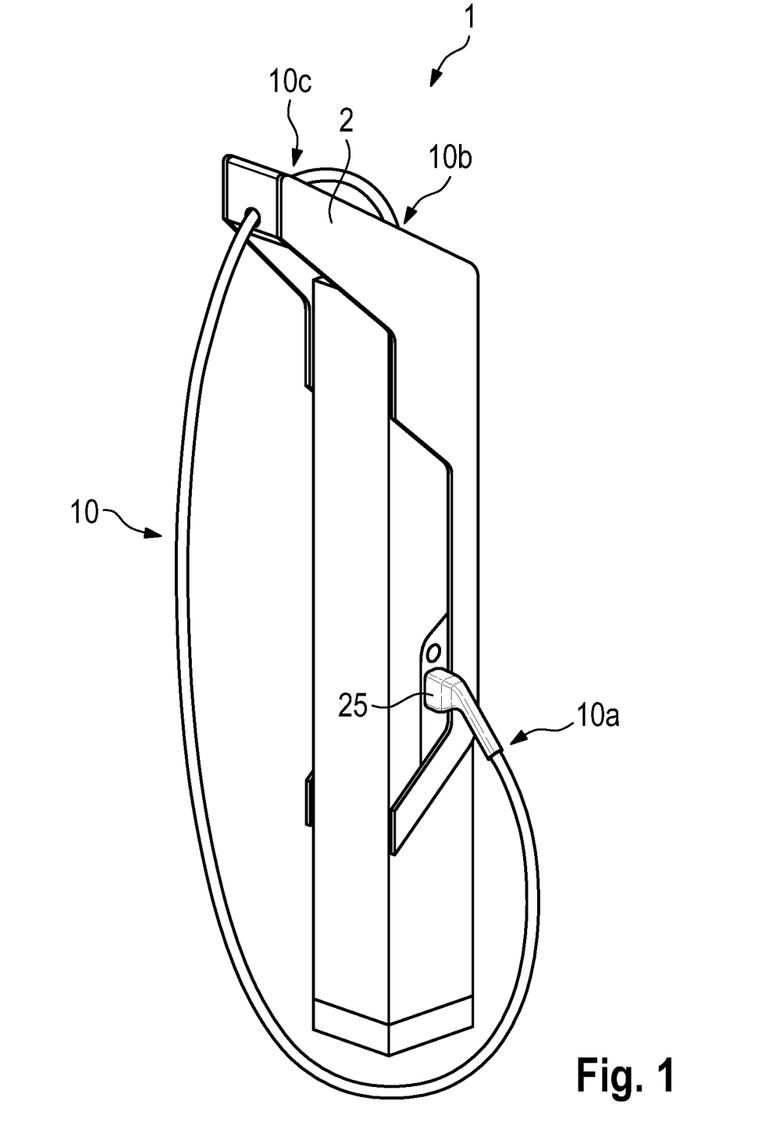
FIG. 1 shows a charging station together with a motor vehicle charging cable according to the invention.

FIG. 1 shows a charging station 1, at which an electric vehicle or hybrid vehicle can be charged. In this case, the charging station 1 serves for DC voltage charging of the electric vehicle or hybrid vehicle. A motor vehicle charging cable 10 is provided at the charging station 1.

At a first end 10a of the motor vehicle charging cable 10, the motor vehicle charging cable 10 has a charging plug 25, via which the motor vehicle charging cable 10 is able to be coupled to a motor vehicle, namely to a charging socket of the motor vehicle. At said first end 10a, the motor vehicle charging cable 10 is fixed to the charging plug 25. At an opposite, second end 10b of the motor vehicle charging cable 10, the latter is coupled to the charging station 1, namely to electrical power or conduction components of the charging station 1 in order ultimately to provide the DC voltage for DC voltage charging and to transmit it via the motor vehicle charging cable 10 in the direction of the motor vehicle to be charged. At said first end 10b, the motor vehicle charging cable 10 is fixed to the charging station 1.

In the exemplary embodiment shown in FIG. 1, the motor vehicle charging cable 10 is fixed at a total of three positions in corresponding mounts, specifically at the charging plug 25 in the region of the first end 10a, at the charging station 1 in the region of the second end 10b, and also at a position 10c between the first end 10a and the second end 10b, at which position the motor vehicle charging cable 10 is fixed to a cantilever 2 of the charging station 1.

Figure 2:
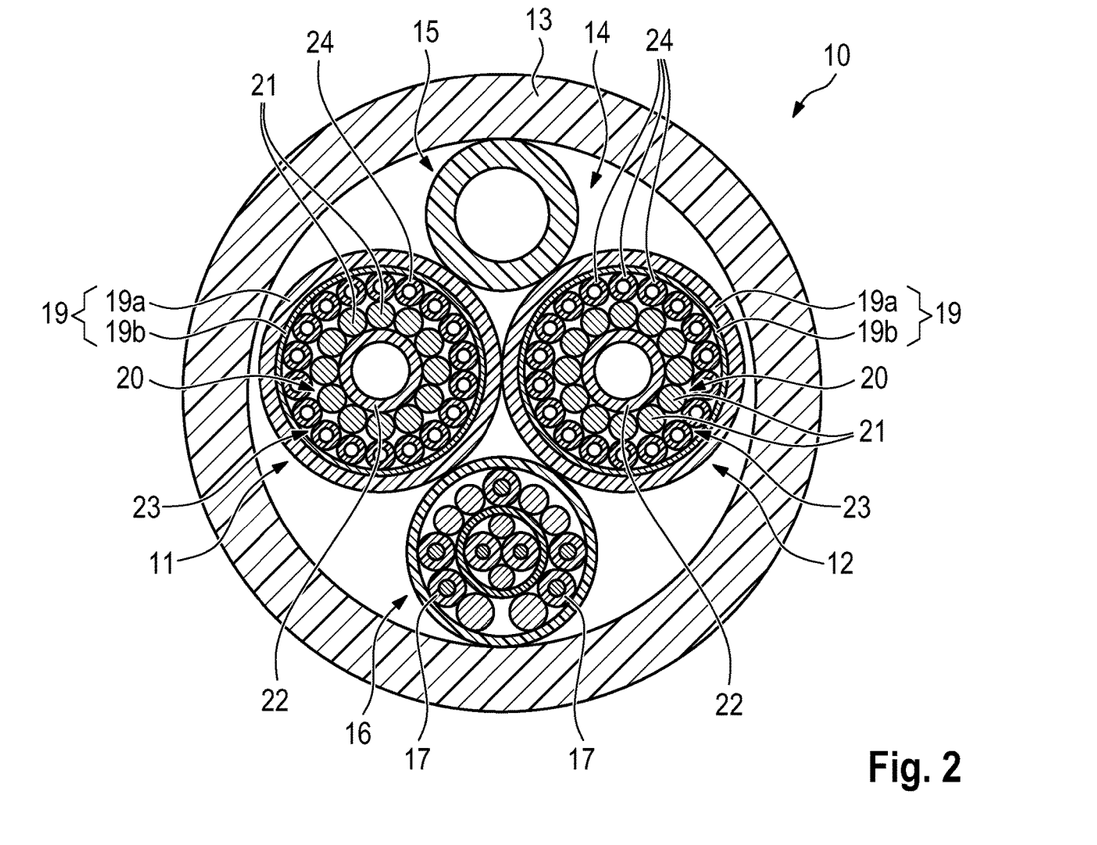
FIG. 2 shows a cross section through a motor vehicle charging cable according to the invention at a position between mounts.

FIG. 2 is a highly schematic cross section through the motor vehicle charging cable 10 at a position between the ends 10a, 10b and outside the position 10c.

The motor vehicle charging cable 10 has a first electrical conductor 11 for a first DC voltage phase and a second electrical conductor 12 for a second DC voltage phase. The two electrical conductors 11, 12 are surrounded by a cable sheath 13.

Within a cavity 14 of the motor vehicle charging cable 10 defined by the cable sheath 13, not only are the two electrical conductors 11, 12 for the two DC voltage phases positioned there in the exemplary embodiment shown in FIG. 1, rather a ground conductor 15 or equipotential bonding conductor and a control conductor 16 having a plurality of control lines 17 also run within said cavity 14 in the exemplary embodiment shown in FIG. 1. It is also possible for only the ground conductor 15 or equipotential bonding conductor or the control conductor 16 to be present. It is also possible for a plurality of control conductors 16 to be present. Just the term ground conductor 15 is used hereinafter. A ground conductor can also be referred to as an equipotential bonding conductor.

The first electrical conductor 11 and also the second electrical conductor 12 each have a conductor sleeve 19 composed of an outer sleeve layer 19a and an inner sleeve layer 19b. The respective outer sleeve layer 19a is preferably a sleeve layer composed of plastic, in particular an outer sleeve layer 19a composed of TPE (thermoplastic elastomers). The inner sleeve layer 19b, which is adjacent on the inside to the outer sleeve layer 19a of the conductor sleeve 19 of the respective electrical conductor 11, 12, is a cooling-fluid-impermeable aluminum composite film or preferably a PET or PETP (polyethylene terephthalate) composite film.

Preferably, the PET or PETP composite film providing the inner sleeve layer 19b of the conductor sleeve 19 of the respective electrical conductor 11, 12 is coated with an adhesive layer or self-adhesive at a side facing the outer sleeve layer 19a, such that the two sleeve layers 19a, 19b of the conductor sleeve 19 of the respective electrical conductor 11, 12 adhere to one another.

Each of the two electrical conductors 11, 12 has a conductor core strand 20 composed of a plurality of conductor cores 21 that is positioned within the respective conductor sleeve 19, each of the electrical conductors 11, 12 comprising a total of twelve conductor cores 21 in the exemplary embodiment shown in FIG. 1. This number can also be different. Each of said conductor cores 21 comprises a plurality of preferably twisted core litz wires (not shown).

Each of the two electrical conductors 11, 12 has a first cooling fluid channel 22 for cooling the conductor core strand 20 of the respective electrical conductor 11, 12 from the inside, wherein this first, inner cooling fluid channel 22 is enclosed by the conductor cores 21.

Preferably, the conductor cores 21 are twisted around the first, inner cooling channel 22 defined by a tube or hose.

Each of the two electrical conductors 11, 12 furthermore has a second cooling fluid channel 23 for cooling the respective conductor core strand 20 of the respective electrical conductor 11, 12 from the outside, wherein said second cooling fluid channel 23 encloses the conductor cores 21 of the respective electrical conductor 11, 12 on the outside.

In this case, a plurality of tubular spacers 24 are positioned between the conductor cores 21 and the inner sleeve layer 19b of the conductor sleeve 19 of the respective electrical conductor 11, 12, said spacers subdividing the respective second, outer cooling fluid channel 23, the cooling fluid flowing through and flowing around said spacers, and said spacers bearing firstly against one another and secondly against the inner sleeve layer 19b of the conductor sleeve 19 of the respective electrical conductor 11, 12 and preferably also against the conductor cores 21 of the respective electrical conductor 11, 12.

In the exemplary embodiment shown in FIG. 2, each of the electrical conductors 11, 12 comprises a total of eighteen tubular spacers 24. The number of spacers 24 can also be different.

The cooling fluid flows in a first direction through the first, inner cooling fluid channel 22 of the respective electrical conductor 11, 12 of the motor vehicle charging cable 10 according to the invention and said cooling fluid channel preferably forms an outgoing path for cooling fluid.

Via the first, inner cooling fluid channel 22, the conductor cores 21 of the respective electrical conductor 11, 12 are coolable from the inside.

The cooling fluid flows in an opposite, second direction through the second, outer cooling fluid channel 23 of the respective electrical conductor 11, 12 of the motor vehicle charging cable 10 and said cooling fluid channel preferably forms a return path for cooling fluid. Cooling fluid that flows through the second, outer cooling fluid channel 23 cools the conductor cores 21 of the respective electrical conductor 11, 12 directly or immediately from the outside.

The conductor cores 21 of the respective electrical conductor 11, 12 preferably bear no insulation layer, that is to say are insulation-layer-free, such that the cooling fluid of the second, outer cooling fluid channel 23 can flush directly around said conductor cores.

Via the second, outer cooling fluid channel 23, the conductor cores 21 of the respective electrical conductor 11, 12 are coolable from the outside.

The first, inner cooling fluid channel 22 and also the second, outer cooling fluid channel 23 of the respective electrical conductor 11, 12 define a conductor-specific cooling circuit for the respective electrical conductor 11, 12, namely for the conductor cores 21 thereof.

Each electrical conductor 11, 12 is individually or specifically cooled, to be precise from the inside and outside via a specific cooling circuit.

The tubular spacers 24 through which the cooling fluid flows and around which the cooling fluid flows bear against the inner sleeve layer 19b of the conductor sleeve 19 of the respective electrical conductor 11, 12 and also against the conductor cores 21 of the respective electrical conductor 11, 12, wherein the spacers 24 preferably bear adhesively against the inner sleeve 19b of the conductor sleeve 19 of the respective electrical conductor 11, 12.

For this purpose, the PET or PETP composite film that provides the inner sleeve layer 19b of the conductor sleeve 19 of the respective electrical conductor 11, 12 is preferably coated with an adhesive layer or self-adhesive at a side facing away from the outer sleeve layer 19a.

Adjacent spacers 24 in each case bear loosely against one another. Likewise, the spacers 24 bear loosely against the conductor cores 21 and are preferably twisted around the conductor cores 21.

In order to cool the conductor cores 21 of each electrical conductor 11, 12 of the motor vehicle charging cable 10, accordingly cooling fluid is able to be guided through the inner, first cooling fluid channel 22 in the sense of an outgoing path in order to cool the conductor cores 21 from the inside.

In the region of the end 10a of the motor vehicle charging cable 10, the cooling fluid guided through the first cooling fluid channel 22 is able to be diverted into the second, outer cooling fluid channel 23 in order then to guide the cooling fluid back in the sense of a return path via the second cooling fluid channel 23 from the motor-vehicle-side end of the motor vehicle charging cable 10 in the direction of the charging-station-side end 10b of the motor vehicle charging cable 10.

In this case, in the region of the second cooling fluid channel 23 the cooling fluid flows through the cooling fluid channel 23 in such a way that the cooling fluid flows through and flows around the spacers 24. In this case, the inner sleeve layer 19b of the conductor sleeve 19 of the respective electrical conductor 11, 12 prevents cooling fluid from leaving the respective electrical conductor 11, 12 via the conductor sleeve 19.

The cable sheath 13 closes off the motor vehicle charging cable 10 toward the outside and defines the cavity 14 for receiving the electrical conductors 11, 12, the at least one control conductor 16 and the ground conductor 15 or equipotential bonding conductor.

As explained above, in addition to the electrical conductors 11, 12 and in addition to the control conductor 16, preferably the ground conductor 15 is positioned in the cavity 14 defined by the cable sheath 13. In accordance with FIG. 2, no hoselike filling elements that restrict the relative movement between the conductors 11, 12, 15 and 16 are positioned in the cavity 14 in this case. Rather, at those positions of the motor vehicle charging cable 10 at which the latter is not fixed in a mount and has the construction in accordance with the cross section in FIG. 2, the relative movement between the conductors 11, 12, 15 and 16 is preferably exclusively limited by the cable sheath 13.

At those positions of the motor vehicle charging cable 10 at which the motor vehicle charging cable 10 is fixed in mounts, however, said motor vehicle charging cable has a construction deviating from FIG. 2, namely to the effect that at said positions of the motor vehicle charging cable 10, specifically at least in the region of the first end 10a and of the second end 10b and, in the exemplary embodiment in FIG. 1, also at the position 10c, an elastic shaped element 18 is in each case arranged between the cable sheath 13 and the conductors 11, 12, 15 and 16, said shaped element guiding and clamping the electrical conductors 11, 12, the ground conductor 15 or equipotential bonding conductor and/or the at least one control conductor 16 and restricting the relative movement between same in addition to the cable sheath 13.

Figure 3:
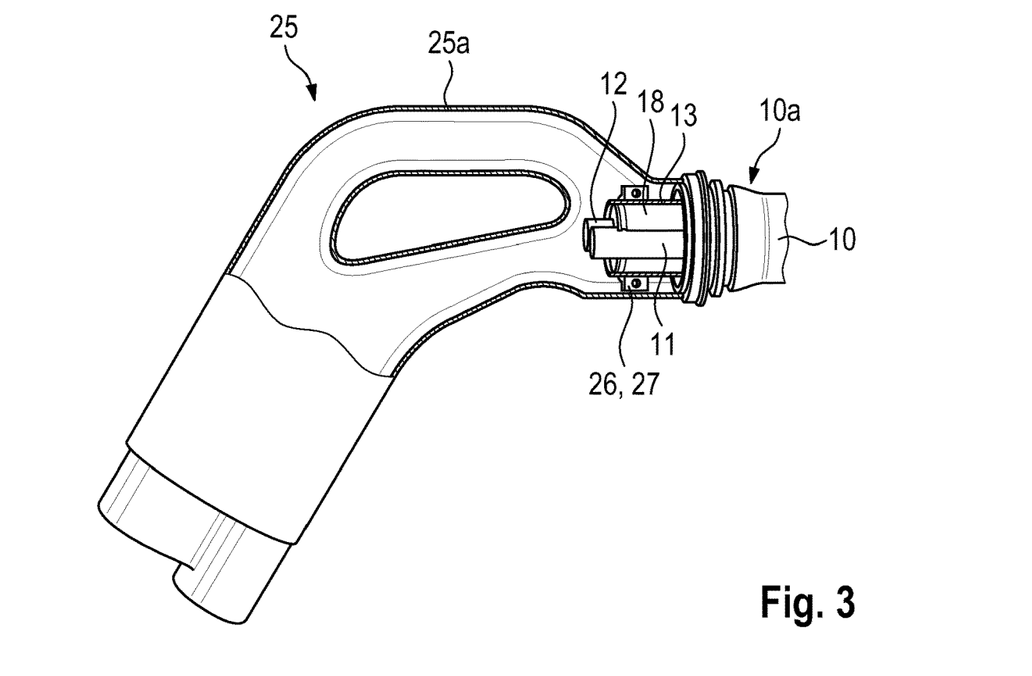
FIG. 3 shows a detail of the motor vehicle charging cable in the region of a first end, via which the motor vehicle charging cable is able to be coupled to a charging socket of a motor vehicle via a charging plug secured to the first end.
Figure 4:
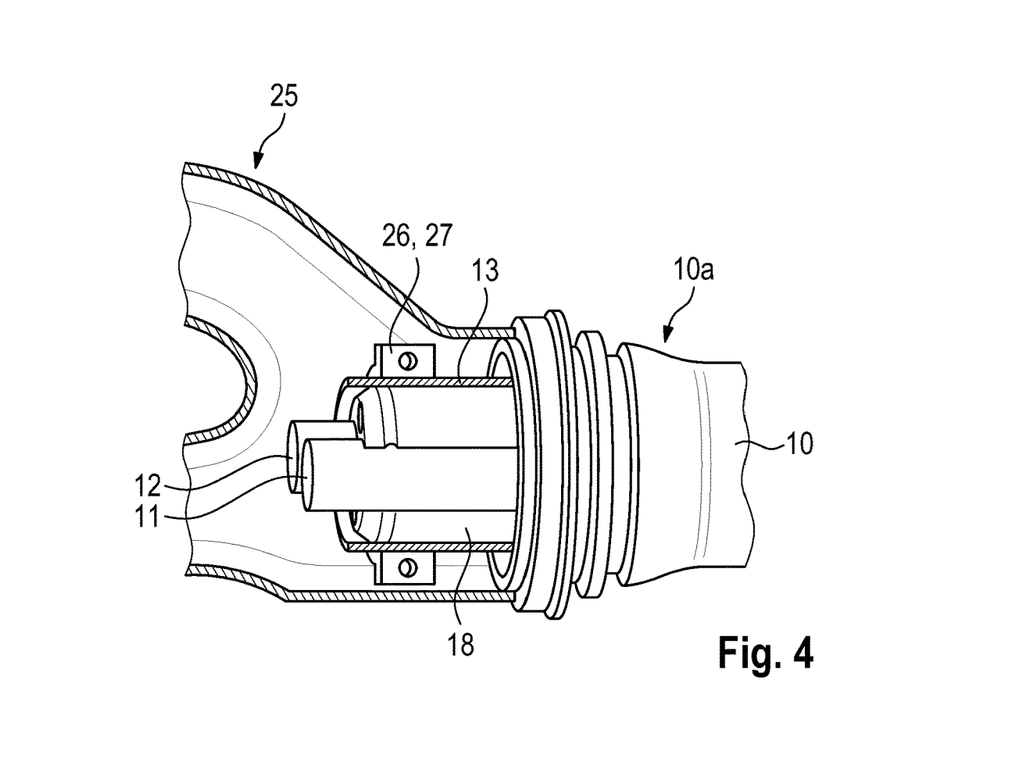
FIG. 4 shows a detail of FIG. 3.

FIGS. 3 and 4 show details of the motor vehicle charging cable 10 according to the invention in the region of the first end 10a thereof, at which the motor vehicle charging cable 10 has the charging plug 25, via which the motor vehicle charging cable 10 is able to be coupled to a charging socket of an electric vehicle or hybrid vehicle. In the region of the charging plug 25, the motor vehicle charging cable 10 is fixed in a mount or in the charging plug 25.

The first end 10a of the motor vehicle charging cable 10 is fixed in the region of said charging plug 25, wherein the shaped element 18 is positioned between the cable sheath 13 and the electrical conductors 11, 12, which are visible or shown in FIGS. 3 and 4, and the ground conductor 15 or equipotential bonding conductor and at least one control conductor 16, which are not shown in FIGS. 3 and 4. As can be gathered from FIGS. 3 and 4, a clamping element 26 composed of two clamping element halves 27 is positioned at the end 10a around the motor vehicle charging cable 10, namely around the cable sheath 13, FIGS. 3 and 4 showing only one such clamping element half 27 of the clamping element 26, which together define a clamping ring. By means of the clamping ring provided by the clamping element 26 or the clamping element halves 27 thereof, the cable sheath 13 is pressed against the shaped element 18 and clamped on same.

Figure 5:
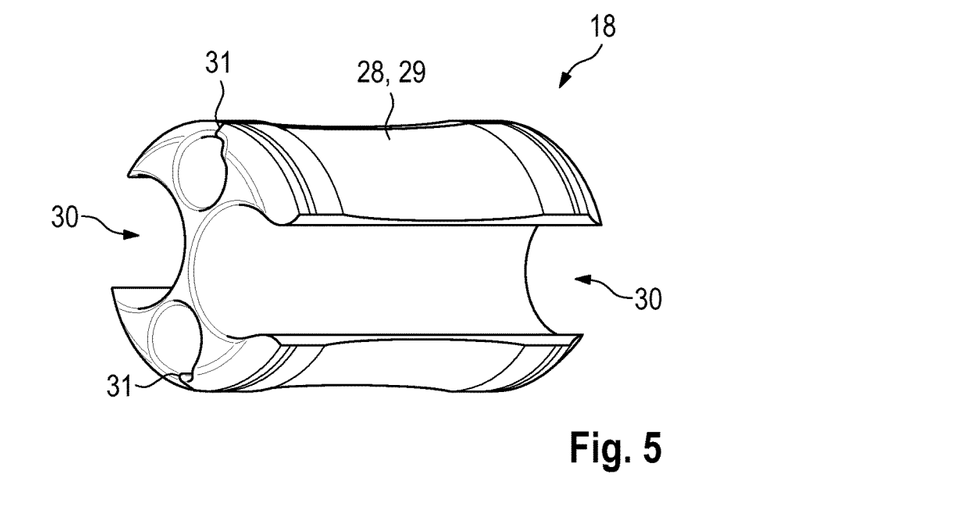
FIG. 5 shows a detail of FIG. 4, namely a shaped element.

FIG. 5 shows a perspective illustration of the shaped element 18 by itself. The shaped element 18 has a cylindrical main body 28, wherein grooves 30 and respectively slots 31 are formed on a lateral surface 29 of the main body 28 and extend in the longitudinal direction of the main body 28 and interrupt the lateral surface 29 of the main body 28. Via said grooves 30 and respectively slots 31, the conductors 11, 12, 15 and 16 are insertable into the shaped element 18, namely the electrical conductors 11, 12 via the grooves 30 and the ground conductor 15 or equipotential bonding conductor and the at least one control conductor 16 via the slots 31, such that the conductors 11, 12, 15 and 16 are guided in corresponding cutouts of the shaped element 18.

The respective shaped element 18 preferably consists of a polyamide material.

By means of the clamping element 26, the cable sheath 13 is pressed against the shaped element 18 and the shaped element 18 is pressed against the conductors 11, 12, 15 and 16, such that then the conductors 11, 12, 15 and 16 are fixed non-displaceably with respect to one another at the end 10a of the motor vehicle charging cable 10 and a mounting or clamping of the motor vehicle charging cable 10 is advantageously possible.

Figure 6:
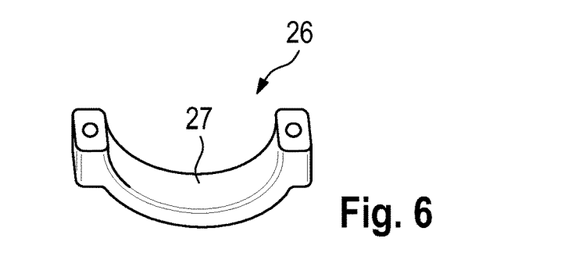
FIG. 6 shows a further detail of FIG. 4, namely a part of a clamping element.

FIG. 6 shows a perspective illustration of one clamping element half 27 of a clamping element 26 by itself, wherein clamping element halves 27, which together define a clamping ring, are preferably connected to one another by screws.

The shaped element 18 is preferably a shaped element composed of a flexible material, such as a polyamide material, for example. The cable sheath 13 is preferably produced from a likewise flexible material, preferably from a polyurethane material. By contrast, the clamping elements 26 or clamping element halves 27 are produced by a dimensionally stable, rigid and less flexible plastic.

Figure 7:
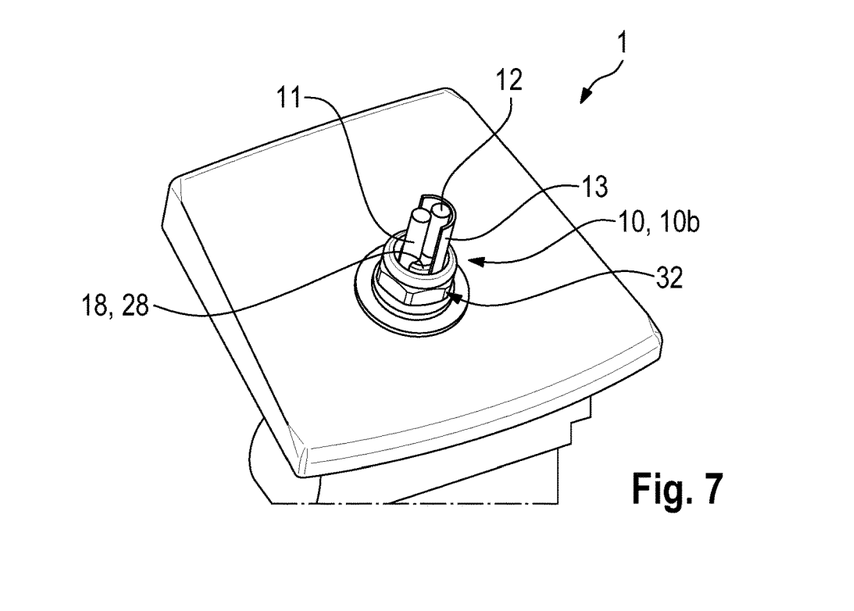
FIG. 7 shows a detail of the motor vehicle charging cable in the region of a second end, via which the motor vehicle charging cable is able to be coupled to the charging station.

FIG. 7 shows a detail of the motor vehicle charging cable 10 in the region of the second end 10b thereof, via which said motor vehicle charging cable is fixed to the charging station 1. In this case, FIG. 7 shows a cross section through the charging cable 10 with cable sheath 13 partly removed, FIG. 7 showing from the motor vehicle charging cable 10 the cable sheath 13 in part and also the two electrical conductors 11, 12 and the shaped element 18.

The ground conductor 15 or equipotential bonding conductor and also the at least one control conductor 16 are not shown in FIG. 7, just like in FIGS. 3 and 4, for the sake of simplicity.

At the second end 10b of the motor vehicle charging cable 10 as well, via which the latter is coupled to the charging station 11, accordingly the shaped element 18 is positioned between the cable sheath 13 and the conductors 11, 12, 15 and 16, said shaped element restricting the relative movement between the conductors 11, 12, 15 and 16, and a mounting or clamping of the motor vehicle charging cable 10 is advantageously possible.

At the second end 10b as well, a clamping element 32 is arranged around the cable sheath 13 and presses the cable sheath 13 against the shaped element 18 and the shaped element 18 against the conductors 11, 12, 15 and 16, said clamping element 32 being embodied like a clamping enclosure having two enclosure parts that are able to be screwed with respect to one another. When a first enclosure part is tightened, the second enclosure part of the clamping element 32 is then pressed against the cable sheath 13.

Figure 8:
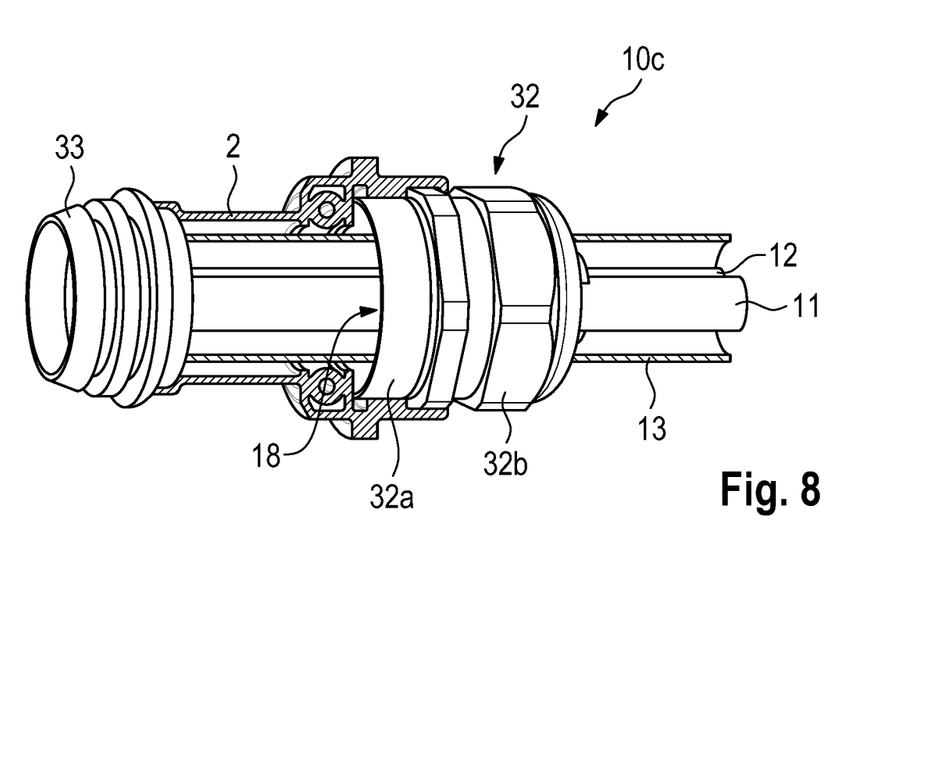
FIG. 8 shows a detail of the motor vehicle charging cable in the region of a further mount for the motor vehicle charging cable, said further mount being positioned between the first end and the second end.

FIG. 8 shows an excerpt from the motor vehicle charging cable 10 in the region of the position 10c, at which the motor vehicle charging cable is fixed in the region of the cantilever 2 of the charging station. In this case, a shaped element 18 is positioned between the cable sheath 13 and the conductors, of which once again only the electrical conductors 11, 12 are shown in FIG. 8, said shaped element being concealed by the clamping element 32, however, in the view in FIG. 3. Just like the clamping element 32 in FIG. 7, the clamping element 32 in FIG. 8 is embodied as a clamping enclosure with two enclosure halves 32a, 32b that are rotatable relative to one another, wherein, by means of rotating the enclosure half 32b relative to the enclosure half 32a, the enclosure half 32a is pressed against the cable sheath 13 and the cable sheath 13 is thus pressed against the shaped element 18, in order to ensure once again here a secure clamping of the conductors 11, 12, 15 and 16. FIG. 8 furthermore shows a sealing element 33, which seals the charging cable 10 in the region of the cantilever 2 of the charging station 1 and protects it against friction at sharp edges.

Figure 9:
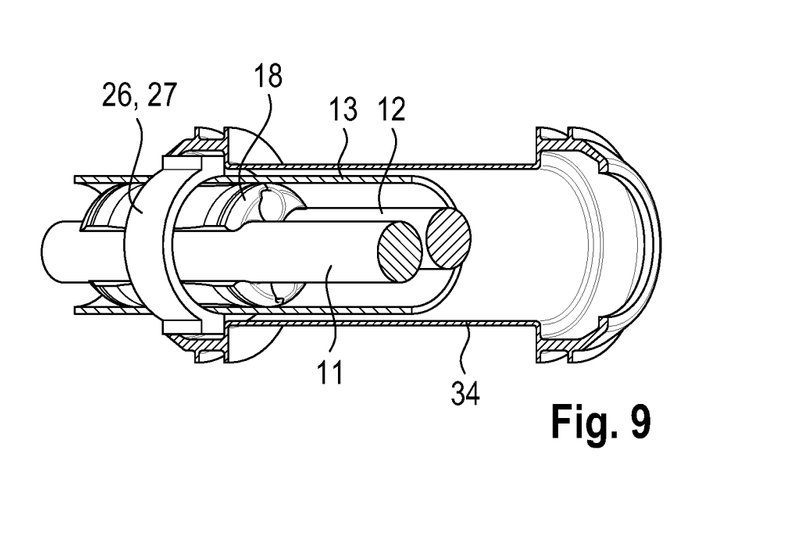
FIG. 9 shows a detail of the motor vehicle charging cable in the region of a further mount for the motor vehicle charging cable, said further mount being positioned between the first end and the second end.

It is possible, adjacent to the first end 10a and thus adjacent to the charging plug 25, which has a handle 25a, to provide a further handle 34, wherein said further handle 34 then serves for gripping the charging cable with a different hand than the hand that grips the charging plug 25 in the region of the handle 25a thereof. FIG. 9 shows a cross section through the charging cable 10 in the region of such a further handle 34, wherein the charging cable 10 is fixed at this position, too, and wherein at this position a shaped element 18 is once again positioned between the cable sheath 13 and the conductors 11, 12, 15 and 16. Analogously to FIGS. 3 to 6, a clamping ring 26 composed of the clamping ring halves 27 is arranged around the cable sheath 13, said clamping ring surrounding the cable sheath 13 and pressing it against the conductors 11, 12, 15 and 16 and thus advantageously enabling a mounting or clamping of the conductors 11, 12, 15, 16 of the motor vehicle charging cable 10.

The motor vehicle charging cable 10 has a simple construction. The shaped elements 18 are used exclusively at those positions of the charging cable 10 at which the latter is fixed in mounts, said shaped elements limiting the relative movement of the conductors 11, 12, 15 and 16 with respect to the cable sheath 13 and advantageously enabling a mounting or clamping of the motor vehicle charging cable. No further, cylindrical filling elements that restrict relative movement of the conductors 11, 12, 15 and 16 over and above the cable sheath 13 are used. As a result, the motor vehicle charging cable 10 has small bending radii and can be handled easily.

What is claimed is:

1. A motor vehicle charging cable for DC voltage charging of an electrical energy store of a motor vehicle, the motor vehicle charging cable having a first end, via which the motor vehicle charging cable is able to be coupled to a charging socket of a motor vehicle via a charging plug secured to the first end, and a second end, via which the motor vehicle charging cable is able to be coupled to a charging station, the motor vehicle charging cable comprising:

conductors that include at least one of: a cooling-fluid-cooled first electrical conductor for a first DC voltage phase, a cooling-fluid-cooled second electrical conductor for a second DC voltage phase, a ground conductor, an equipotential bonding conductor and/or at least one control conductor;

a cable sheath enclosing the conductors;

at least first and second shaped elements arranged between the cable sheath and the conductors at positions in proximity respectively to the first end and the second end of the motor vehicle charging cable, and first and second mounts in proximity to the first and second ends of the motor vehicle charging cable, areas of the motor vehicle charging cable in proximity to the first and second ends being fixed respectively in the first and second mounts, the shaped elements guiding, clamping and restricting a relative movement between the conductors, and wherein the cable sheath restricts a relative movement between the conductors at positions of the motor vehicle charging cable between those positions of the motor vehicle charging cable that are fixed in mounts.

2. The motor vehicle charging cable of claim 1, wherein each of the respective shaped elements has a cylindrical main body with a lateral surface formed with slots or grooves that run in a longitudinal direction of the motor vehicle charging cable and via which the conductors are insertable into cutouts of the respective shaped element.

3. The motor vehicle charging cable of claim 1, wherein the respective shaped element are made of a polyamide material.

4. The motor vehicle charging cable of claim 1, further comprising clamping elements arranged around the cable sheath at positions along the motor vehicle charging cable at which the shaped elements are disposed, the clamping elements pressing the cable sheath against the shaped elements and thereby clamping the conductors of the motor vehicle charging cable.

5. The motor vehicle charging cable of claim 4, further comprising clamping elements arranged around the cable sheath at positions aligned respectively with the shaped elements.

6. The motor vehicle charging cable of claim 5, wherein each of the clamping elements is a clamping ring having two parts that are screwed to one another.

7. The motor vehicle charging cable of claim 1, wherein the charging station has a roof, and the motor vehicle charging cable further has an intermediate mount fixed at a position on the motor vehicle charging cable between the first end and the second end of the motor vehicle charging cable and the intermediate mount being fixed in the roof of the charging station, and an intermediate shaped element arranged between the cable sheath and the conductors at a position inward of the intermediate mount.

8. The motor vehicle charging cable of claim 7, further comprising a handle adjacent to the first end and comprising one of the mounts, one of the shaped elements being inward of the handle.

9. The motor vehicle charging cable of claim 1, wherein the conductors include the first and second electrical conductors each of which comprises:

a conductor sleeve;

a conductor core running within the conductor sleeve and including conductor core strands;

a first cooling fluid channel enclosed by the conductor core strands of the respective conductor core for cooling the respective conductor core from positions inward of the conductor core strands;

a second cooling fluid channel enclosing an outside the respective conductor core for cooling the respective conductor core strands of the respective conductor core; and tubular spacers positioned between the conductor core strands of the respective electrical conductor and the conductor sleeve of the respective electrical conductor, the tubular spacers subdividing the respective second cooling fluid channel so that cooling fluid flows through and around the tubular spacers, and the tubular spacers bearing against one another and against the conductor sleeve of the respective electrical conductor.

10. The motor vehicle charging cable of claim 9, wherein the conductor sleeve comprises an outer sleeve layer and an inner sleeve layer, the tubular spacers being positioned between the conductor core strands of the respective electrical conductor and the inner sleeve layer of the conductor sleeve of the respective electrical conductor, and the tubular spacers bearing against one another and against the inner sleeve layer of the conductor sleeve of the respective electrical conductor.

11. The motor vehicle charging cable of claim 10, wherein the tubular spacers that are adjacent to one another bear loosely against one another, the inner sleeve layer is coated with an adhesive or is self-adhesive at the side facing the spacers and the tubular spacers bear adhesively against the inner sleeve layer of the conductor sleeve of the respective electrical conductor, the tubular spacers bear against the conductor cores and are twisted around the conductor cores.

12. The motor vehicle charging cable of claim 9, wherein the cooling fluid is able to flow through the first cooling fluid channel of the respective electrical conductor in a first direction and through the second cooling fluid channel of the respective electrical conductor in an opposite, second direction, the first and second cooling fluid channels of the respective electrical conductor define a conductor-specific cooling circuit of the respective electrical conductor.

* * * * *